May 27, 1924.
L. K. SNELL
ROBE SUPPORT
Filed Dec. 26, 1919
1,495,267
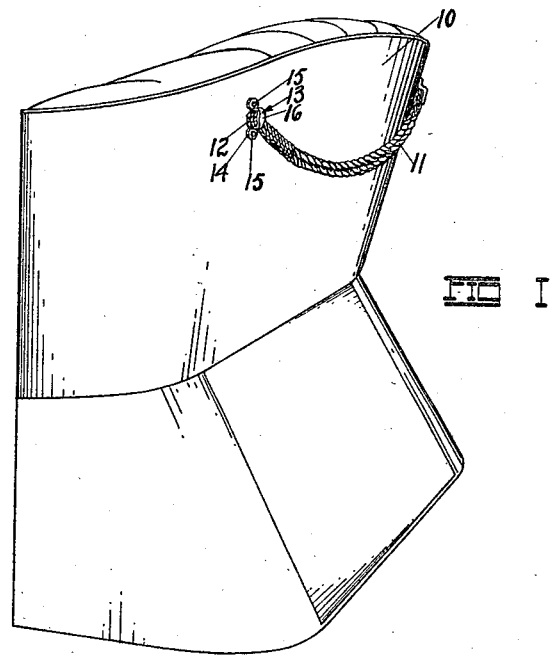
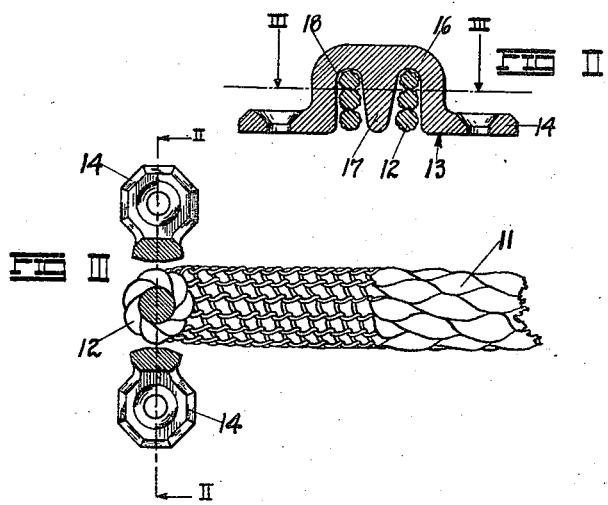
INVENTOR.
Lyle K. Snell
BY
ATTORNEY Patented May 27, 1924.

1,495,267

UNITED STATES PATENT OFFICE.

LYLE K. SNELL, OF TOLEDO, OHIO, ASSIGNOR TO THE WILLYS-OVERLAND COMPANY, OF TOLEDO, OHIO, A CORPORATION OF OHIO.

ROBE SUPPORT.

Application filed December 26, 1919. Serial No. 347,570.

*To all whom it may concern:*

Be it known that I, LYLE K. SNELL, a citizen of the United States, residing at Toledo, county of Lucas, State of Ohio, have invented certain new and useful Improvements in Robe Supports, of which I declare the following to be a full, clear, and exact description.

This invention relates to a robe or garment support for an automobile wherein a cord or cable is attached at opposite ends to a part of the automobile; for example, to the rear of the front seat.

The object of the invention is to provide an improved means of securing the ends of the cord or cable to the automobile, which means includes a loop or ring formed of the same material as the cord or cable, and woven into the end thereof, and a fastening member having a tongue to engage in the loop or ring.

A further object of the invention is to provide a robe cord and fastening means which is of simple construction and efficient in operation.

Further objects of the invention relate to economies of manufacture and details of construction as will hereinafter appear from the detailed description to follow.

The objects of the invention are accomplished in one instance by the devices and means described in the following specification, but it is evident that the same may be varied without departing from the scope of the invention as pointed out in the appended claims. A structure constituting one embodiment of the invention is illustrated in the accompanying drawing forming a part hereof in which:

Figure I is a perspective view of a portion of a vehicle body illustrating the manner of securing the robe cord to the vehicle.

Figure II is a sectional view taken on the line II—II of Fig. III, showing the fastening member and its relation to the cord.

Figure III is a sectional view taken on the line III—III of Fig. II, showing portions of the fastening member in section and the end of the cord held in position thereby.

In the drawing, similar reference characters refer to corresponding parts throughout the several views, and the sectional views are taken looking in the direction of the arrows at the ends of the section lines.

It has been the practice heretofore to weave or secure metal fastening devices into the ends of the robe cord and then secure these devices to the vehicle body. Because of the different designs which may be used in fastening devices, and because of the different sizes, lengths, and styles of robe cords, it has been found that this practice is very objectionable and expensive and to overcome these objections I have provided a cord having loops of the same material as the cord woven into the ends of the cord and separate fastening means for securing the cord to the vehicle body.

Referring to the numbered parts of the drawing, 10 represents a portion of a vehicle body which in this instance is illustrated as the back of the front seat of an automobile, and 11 the cord over which robes or articles of wearing apparel may be hung. The ends of the cord 11 are provided with loops 12 which may be of the same material as the cord and are woven or braided into the ends of the cord to receive a portion of the fastening member 13 which will be hereinafter described.

The fastening member 13 is provided with ends 14 which may be secured to the vehicle body 10 by means of screws or other suitable fastening means 15, and an outturned portion 16 substantially centrally of which may be provided an inturned tongue 17 to receive the loops 12 of the cord 11. It will be seen from the construction as illustrated in Fig. II that because of the outturned portion 16 and inturned tongue 17, of the fastener member 13, that a recess 18 is provided in which the loop 12 of the cord may rest when the fastening member is secured to the vehicle. The inturned tongue 17 may be constructed of sufficient length that its inner end will be substantially in line with the outer surface of the vehicle body, thus preventing the cord from becoming accidentally displaced or removed and forming an inexpensive and efficient means for securing the cord.

From the above description it will be seen that a fastening member may be used which in design is like the other hardware of the vehicle body together with any cord having loops in the ends thereof, and while I have shown and described in considerable detail a specific embodiment of my invention, it is to be understood that this showing and description is illustrative only, and that I do not regard the invention as limited to the precise details of construction illustrated or described except in so far as I have included such limitations within the terms of the following claims, in which it is my intention to claim all novelty inherent in my invention broadly as well as specifically.

Having thus described my invention, which I claim as new and desire to secure by Letters Patent, is:

1. In a robe support, a cord adapted to be secured to a portion of a vehicle and having a non-metallic loop woven into the end portion of the cord, and a fastening device provided with an inwardly projecting portion adapted to detachably engage the loop.

2. In a robe support, a cord adapted to be secured to a portion of a vehicle and having a loop formed of similar material of that of the cord woven into the end portion of the cord, and a fastening device provided with an inwardly projecting portion adapted to detachably engage the loop for securing one end of the cord in position.

3. In a robe support, a cord having a loop formed of similar material of that of the cord woven into the end portion of the cord, a fastening member comprising an outturned portion, a tongue projecting inwardly therefrom for detachable engagement with the loop on the cord, and means for securing the end portions of the member to the vehicle.

In testimony whereof, I affix my signature.

LYLE K. SNELL.